United States Patent
Wang (10) Patent No.: US 11,631,408 B2
(45) Date of Patent: Apr. 18, 2023

(54) METHOD FOR CONTROLLING DATA, DEVICE, ELECTRONIC EQUIPMENT AND COMPUTER STORAGE MEDIUM

(71) Applicant: BEIJING DAJIA INTERNET INFORMATION TECHNOLOGY CO., LTD., Beijing (CN)

(72) Inventor: Zhibo Wang, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 199 days.

(21) Appl. No.: 17/139,893

(22) Filed: Dec. 31, 2020

(65) Prior Publication Data

US 2021/0249008 A1  Aug. 12, 2021

(30) Foreign Application Priority Data

Feb. 10, 2020 (CN) .......................... 202010085395.5

(51) Int. Cl.
G10L 15/22 (2006.01)
H04N 21/2187 (2011.01)
H04N 21/4788 (2011.01)

(52) U.S. Cl.
CPC ......... *G10L 15/22* (2013.01); *H04N 21/2187* (2013.01); *H04N 21/4788* (2013.01)

(58) Field of Classification Search
CPC ........ G06F 3/011; G06F 3/012; G06F 3/0304; G06F 3/03543; G06F 3/167;
(Continued)

(56) References Cited

U.S. PATENT DOCUMENTS 5,819,225 A * 10/1998 Eastwood ............. G06F 11/324
704/E15.045
8,781,841 B1 * 7/2014 Wang ...................... H04M 3/56
704/275
(Continued)

FOREIGN PATENT DOCUMENTS

CN          107333086 A    11/2017
CN          107423809 A    12/2017
(Continued)

OTHER PUBLICATIONS

Extended European Search Report dated Jun. 16, 2021, from application No. 21156430.7, 8 pages.
(Continued)

*Primary Examiner* — Gerald Gauthier
(74) *Attorney, Agent, or Firm* — Foley & Lardner LLP (57) ABSTRACT

The present disclosure provides a method for controlling data, a device for controlling data, an electronic equipment, and a storage medium. The method for controlling data includes receiving a first voice signal for a virtual object displayed on a first electronic device collected by the first electronic device; obtaining a first recognition result by parsing and recognizing the first voice signal; generating, based on the first recognition result, a control instruction for controlling the virtual object to perform an action corresponding to the control instruction; and sending the control instruction to the first electronic device and at least one second electronic device in the same virtual space. The disclosure is capable of controlling a process of the virtual object performing a live streaming interaction by using a voice interaction mode, thus reducing user operations and improving user experience.

20 Claims, 6 Drawing Sheets

(58) Field of Classification Search
CPC .. G06F 11/324; G06F 16/9535; G06F 16/958; G06F 21/46; G06F 40/279; G06T 7/246; G06T 19/006; G06V 40/20; G08C 17/02; G10L 15/16; G10L 15/1822; G10L 15/22; G10L 15/30; G10L 17/00; G10L 25/81; G10L 2015/223704; G10L 15/00; G10L 15/08; G10L 15/18; G10L 15/1815; G10L 21/0272; G11B 27/28; H04L 12/282; H04L 51/02; H04L 65/4015; H04L 65/1059; H04L 67/01; H04M 3/56; H04M 1/72403; H04N 1/00244; H04N 21/2187; H04N 21/4316; H04N 21/4788; H04N 21/25891; H04W 8/02

See application file for complete search history.

(56) References Cited

U.S. PATENT DOCUMENTS

| | | | | |
|---|---|---|---|---|
| 9,223,540 | B2* | 12/2015 | Park | H04M 1/72403 |
| 10,425,780 | B1* | 9/2019 | Devaraj | G10L 15/22 |
| 10,448,115 | B1* | 10/2019 | Jamal | G10L 15/1815 |
| 10,593,328 | B1* | 3/2020 | Wang | H04L 65/1059 |
| 10,616,726 | B1* | 4/2020 | Freeman, II | H04W 8/02 |
| 10,777,203 | B1* | 9/2020 | Pasko | G10L 15/18 |
| 10,958,600 | B1* | 3/2021 | Annadata | H04L 51/02 |
| 11,024,304 | B1* | 6/2021 | Smith | G10L 15/22 |
| 11,468,889 | B1* | 10/2022 | Hart | G10L 15/00 |
| 2014/0176315 | A1* | 6/2014 | Moore | G08C 17/02 |
| | | | | 340/12.52 |
| 2015/0088514 | A1* | 3/2015 | Typrin | G10L 17/00 |
| | | | | 704/231 |
| 2015/0134340 | A1* | 5/2015 | Blaisch | G06F 16/958 |
| | | | | 704/275 |
| 2015/0169284 | A1* | 6/2015 | Quast | G06F 16/9535 |
| | | | | 704/275 |
| 2015/0382047 | A1* | 12/2015 | Van Os | H04N 21/4316 |
| | | | | 725/38 |
| 2015/0382079 | A1* | 12/2015 | Lister | G11B 27/28 |
| | | | | 725/38 |
| 2016/0063989 | A1* | 3/2016 | Deleeuw | G06F 3/167 |
| | | | | 345/473 |
| 2016/0260436 | A1* | 9/2016 | Lemay | G06F 3/167 |
| 2017/0083285 | A1* | 3/2017 | Meyers | G10L 15/00 |
| 2017/0339199 | A1* | 11/2017 | Saez | H04L 65/4015 |
| 2018/0032125 | A1* | 2/2018 | Peterson | G06F 3/012 |
| 2018/0108147 | A1* | 4/2018 | Kim | G06T 7/246 |
| 2018/0174363 | A1* | 6/2018 | VanBlon | G06T 19/006 |
| 2018/0342151 | A1* | 11/2018 | VanBlon | G06F 3/011 |
| 2019/0043260 | A1* | 2/2019 | Anderson | G06V 40/20 |
| 2019/0196779 | A1* | 6/2019 | Declerck | G10L 15/08 |
| 2019/0251750 | A1* | 8/2019 | Brewer | G06F 3/0304 |
| 2019/0278621 | A1* | 9/2019 | Thomas | G06F 3/011 |
| 2019/0304446 | A1* | 10/2019 | Scavo | G10L 25/81 |
| 2019/0317648 | A1* | 10/2019 | Pinel | G06F 3/167 |
| 2020/0020331 | A1* | 1/2020 | Kim | G10L 15/30 |
| 2020/0027454 | A1* | 1/2020 | Li | G06F 40/279 |
| 2020/0184963 | A1* | 6/2020 | Joseph | G10L 15/30 |
| 2020/0184970 | A1* | 6/2020 | Kawano | H04N 1/00244 |
| 2020/0349927 | A1* | 11/2020 | Stoimenov | G10L 15/16 |
| 2020/0372906 | A1* | 11/2020 | Jang | H04L 12/282 |
| 2021/0065704 | A1* | 3/2021 | Kim | G10L 15/1822 |
| 2021/0141892 | A1* | 5/2021 | Chambon-Cartier | G06F 21/46 |
| 2021/0191690 | A1* | 6/2021 | Zou | H04L 67/01 |
| 2021/0249006 | A1* | 8/2021 | Bromand | G10L 21/0272 |
| 2021/0249008 | A1* | 8/2021 | Wang | H04N 21/4788 |
| 2022/0197403 | A1* | 6/2022 | Hughes | G06F 3/03543 |

FOREIGN PATENT DOCUMENTS

| | | |
|---|---|---|
| CN | 107438183 A | 12/2017 |
| CN | 109874021 A | 6/2019 |
| CN | 110119700 A | 8/2019 |
| CN | 110610699 A | 12/2019 |
| CN | 110634483 A | 12/2019 |

OTHER PUBLICATIONS

First Office Action issued by the China National Intellectual Property Administration (CNIPA) for corresponding CN Application 202010085395.5, dated Sep. 8, 2022, 12 pages.

* cited by examiner

METHOD FOR CONTROLLING DATA, DEVICE, ELECTRONIC EQUIPMENT AND COMPUTER STORAGE MEDIUM

CROSS-REFERENCE TO RELATED APPLICATIONS

This application claims the priority of the Chinese Patent Application No. 202010085395.5, filed with China National Intellectual Property Administration on Feb. 10, 2020, the disclosure of which is herein incorporated by reference in its entirety.

TECHNICAL FIELD

The disclosure relates to the field of Internet technology, and specifically relates to methods devices, electronic equipment, and computer storage media for controlling data.

BACKGROUND

With the development of technology, online live streaming has become one of leisure interaction scenarios for people in the network era. As a main implementation scenario, a live streaming room has undertaken main goals of platform interacting with user. In the process of real-time network live streaming, an anchor can realize simple interaction with audience through a virtual object raised by a way of cyber petting in the live streaming room, but a mode of interacting with audience via the virtual object is preset on a terminal. At present, the process of interacting with the audience via the virtual object can be summarized as follows. An anchor user operates a control related to a virtual object to realize controlling the virtual object to interact with the audience, such as in response to clicking on the virtual object, a terminal controls the virtual object to perform a designated action, etc. However, the above mode of interacting with the audience via the virtual object is too simple and is cumbersome to operate, which is not conducive to the user experience.

SUMMARY

According to a first aspect of the disclosure, there is provided a method for controlling data applying to a server side. The method may include: receiving a first voice signal for a virtual object displayed on a first electronic device collected by the first electronic device; obtaining a first recognition result by parsing and recognizing the first voice signal; generating, based on the first recognition result, a control instruction for controlling the virtual object to perform an action corresponding to the control instruction; and sending the control instruction to the first electronic device and at least one second electronic device in the same virtual space.

According to a second aspect of the disclosure, there is provided a method for controlling data applying to a first electronic device. The method may include: sending a first voice signal collected for a displayed virtual object to a server side; receiving a control instruction provided by the server side, wherein the control instruction is obtained by recognizing the first voice signal; and using the control instruction to control the virtual object to perform an action corresponding to the control instruction.

According to a third aspect of the disclosure, there is provided a device for controlling data applying for a server side, the device may include: a first voice signal receiving module configured to receive a first voice signal for a virtual object displayed on a first electronic device collected by the first electronic device; a first recognition result obtaining module configured to obtain a first recognition result by parsing and recognizing the first voice signal; a control instruction generation module configured to generate, based on the first recognition result, a control instruction for controlling the virtual object to perform an action corresponding to the control instruction; and a control instruction sending module configured to send the control instruction to the first electronic device and at least one second electronic device in the same virtual space.

According to a fourth aspect of the disclosure, there is provided a device for controlling data applying to a first electronic device. The device may include a first voice signal sending module configured to send a first voice signal collected for a displayed virtual object to a server side; a control instruction receiving module configured to receive a control instruction provided by the server side, wherein the control instruction is obtained by recognizing the first voice signal; and a control instruction using module configured to use the control instruction to control the virtual object to perform an action corresponding to the control instruction.

According to a fifth aspect of the disclosure, there is provided an electronic equipment, which includes a processor and a memory for storing instructions executable by the processor, the processor is configured to implement the method in any one of the first aspect and the second aspect.

According to a sixth aspect of the disclosure, there is provided a computer-readable storage medium, when instructions stored in the computer-readable storage medium, when executed by a processor of an electronic equipment, cause the electronic equipment to implement the steps of the method in any one of the first aspect and the second aspect.

According to a seventh aspect of the disclosure, there is provided a computer program product, which include the method in the first aspect or the second aspect.

It can be seen from the above technical solutions that the embodiments of this application have the following advantages.

DETAILED DESCRIPTION

The example embodiments will be described in detail here, and examples thereof are shown in the accompanying drawings. When the following description refers to the accompanying drawings, unless otherwise indicated, the same numbers in different drawings represent the same or similar elements. The implementation manners described in the following example embodiments do not represent all implementation manners consistent with the disclosure. Rather, they are only examples of devices and methods consistent with some aspects of the disclosure as detailed in the appended claims.

The terms used in the disclosure are only for the purpose of describing specific embodiments, and are not intended to limit the disclosure. The singular forms 'a', 'an', 'said' and 'the' used in the disclosure and appended claims are also intended to include plural forms, unless the context clearly indicates other meanings. It should also be understood that the term 'and/or' used herein refers to and includes any or all possible combinations of one or more associated listed items.

It should be understood that although the terms first, second, third, etc. may be used in the disclosure to describe various information, the information should not be limited to these terms. These terms are only used to distinguish the same type of information from each other. For example, without departing from the scope of the disclosure, the first information may also be referred to as second information, and similarly, the second information may also be referred to as first information. Depending on the context, the word 'if' as used herein can be interpreted as 'when' or 'while' or 'in response to determining'.

Figure 1:
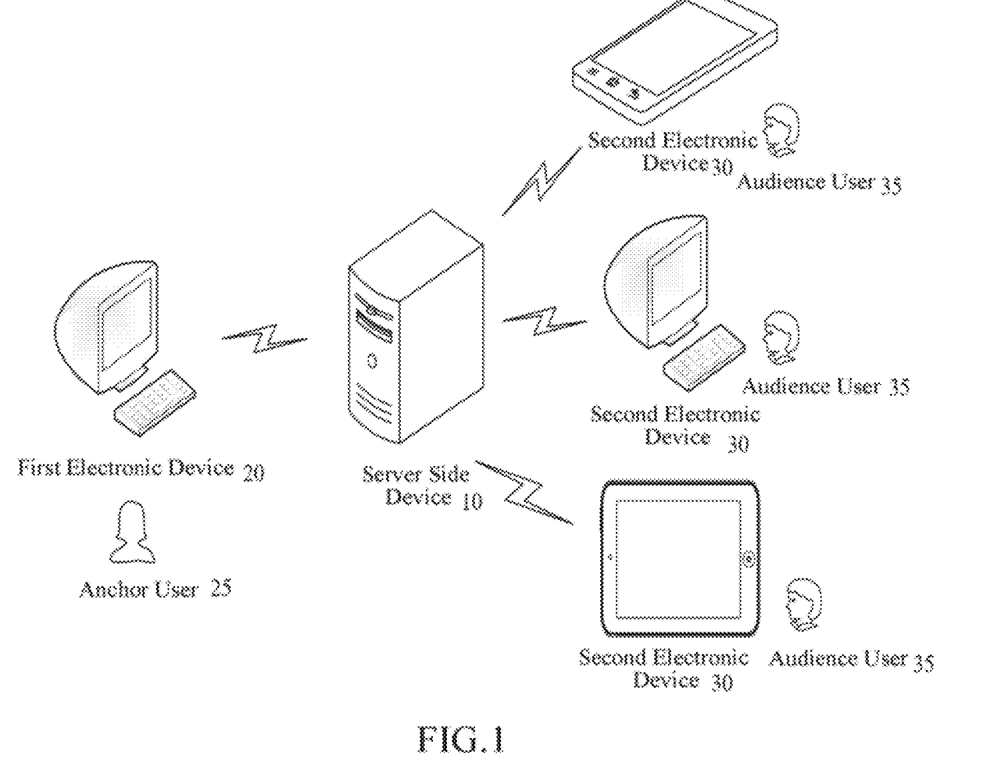
FIG. 1 is a schematic diagram showing an application scenario of a live streaming interaction according to example embodiments of the disclosure.

The solutions of the embodiments of the disclosure can be applied to any scene involving live streaming interaction such as a network live streaming and others. FIG. 1 is a schematic diagram showing an application scenario of a live streaming interaction according to example embodiments of the disclosure. In FIG. 1, the application scenario includes a server used as a server side, and an electronic device such as a smart phone, a tablet, and a personal computer used as a client side 10. The electronic devices 20 and 30 may also be a smart device, such as a Personal Digital Assistant (PDA), a multimedia player, a wearable device and so on. The device at the server side may also be a large computing device such as a cloud server and others.

The server side in FIG. 1 provides a live streaming service to each client side. Users 25 and 35 can install a live streaming client side into a smart electronic device, and obtain the live streaming service through the live streaming client side, or users 25 and 35 can install a browser client side into a smart electronic device, and obtain the live streaming service by logging in a live streaming page provided by the server 10 via the browser client side. Generally, two types of users are involved in a live streaming process, one type of user is an anchor user, and the other type of user is an audience user 35. An anchor live streaming function and a live streaming watching function are provided at the client side. The anchor user 25 can use the live streaming function provided by the client side to conduct a video live streaming, and the audience users 35 can use the watching function provided by the client side to watch live streaming content of the anchor user 25. To facilitate the distinction, in the following, an electronic device that is a client side of the anchor user is called a first electronic device 20, and an electronic device that is a client side of the audience users 35 is called a second electronic device 30. The anchor user 25 can use the live streaming function of the live streaming client on the first electronic device 20 to establish a live streaming room. The audience user 35 can enter the live streaming room established by the anchor user 25 through the watching function of the live streaming client side on the second electronic device 30. Therefore, content live-streamed by the anchor user 25 on the first electronic device 20 will be broadcast to the second electronic device 30 of the audience user 35 in the same live streaming room, thus realizing a process of live streaming and watching of the video.

In the process of real-time network live streaming, the anchor user 25 can realize simple interaction with audience through a virtual object raised by a way of cyber petting in a live streaming room, but a mode of interacting with the audience users 35 via the virtual object is preset on a terminal. At present, a process of interacting with audience users 35 via a virtual object can be summarized as follows. An anchor user 25 operates a control related to the virtual object to realize controlling the virtual object to interact with the audience users 35, such as in response to clicking on the virtual object, the terminal controls the virtual object to perform designated actions, etc. However, the above mode of interacting with the audience via the virtual object is too simple and is cumbersome to operate, which is not conducive to the user experience.

Figure 2:
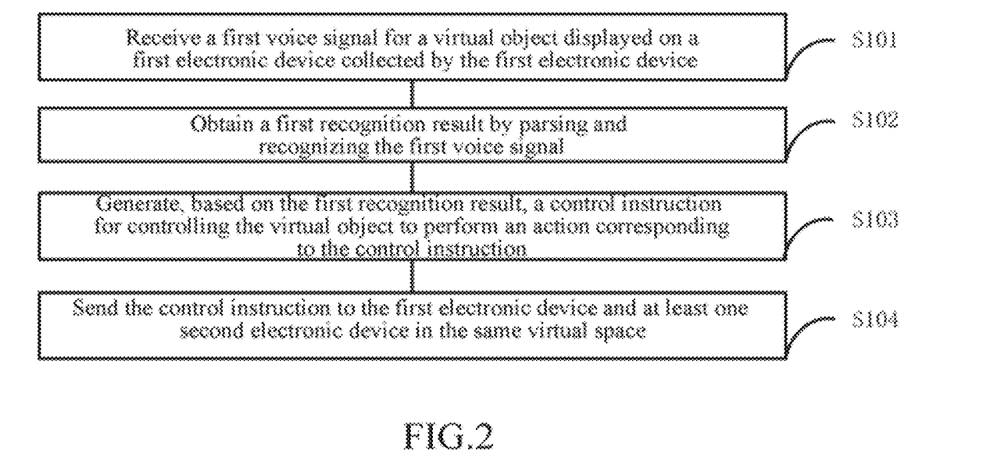
FIG. 2 is a flowchart showing a first method for controlling data according to example embodiments of the present disclosure.

Based on the above problems, the disclosure provides a method for controlling data. FIG. 2 is a flowchart showing a first method for controlling data according to example embodiments of the disclosure, which is applied to a server side, and the server side may be a large computing device such as a server, a cloud server and so on. The first method for controlling data includes the following.

In S101, a first voice signal for a virtual object displayed on a first electronic device collected by the first electronic device is received.

In S102, a first recognition result is obtained by parsing and recognizing the first voice signal.

In S103, a control instruction is generated based on the first recognition result, and the control instruction is used to control the virtual object to perform an action corresponding to the control instruction.

In S104, the control instruction is sent to the first electronic device and several second electronic devices in the same virtual space.

In the embodiments of the disclosure, the anchor user can control the virtual object displayed on the first electronic device by voice. The anchor user can speak corresponding words to the virtual object, and then a first voice signal for the virtual object can be collected by the first electronic device, and sent to the server side. After receiving the first voice signal, the server side may parse and recognize the first voice signal, to obtain the first recognition result. It is understandable that the embodiments of the disclosure do not impose any restrictions on the specific implementation algorithm of voice recognition, and the implementation algorithm can be specifically selected according to actual application scenarios. For example, it may be a voice recognition algorithm based on a Hidden Markov Model (HMM), or a voice recognition algorithm based on a neural network, etc.

Next, after obtaining the first recognition result, the server side can generate the control instruction based on the first recognition result, and the control instruction is used to control the virtual object to perform an action corresponding to the control instruction. After that, the server side sends the generated control instruction to the first electronic device and several second electronic devices in the same virtual space, so that the first electronic device can use the control instruction to control the virtual object to perform the action corresponding to the control instruction, and the second electronic device can use the control instruction to control the virtual object to perform the action corresponding to the control instruction, which realizes a scenario that the anchor user controls the virtual object to interact with audience users by voice. This process not only reduces operation steps of the anchor user, but also improves the entertainment of the live streaming interaction, which is beneficial to increase the enthusiasm of the users to participate in the interaction.

Figure 3:
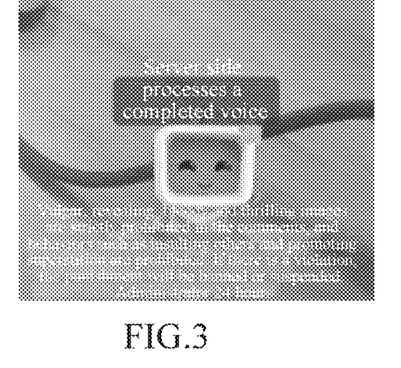
FIG. 3 is a schematic diagram showing a virtual object presented in a greeting 3D form according to example embodiments of the disclosure.

In some examples, for example, the first electronic device collects and sends a first voice signal of 'greeting to audience' to the server side, and the server side may parse and recognize the first voice signal to obtain a first recognition result of 'greeting to audience'. The server side may generate, based on the first recognition result, a control instruction for controlling the virtual object to perform the greeting action, and sends the control instruction to the first electronic device and several second electronic devices in the same virtual space. FIG. 3 is a schematic diagram showing a virtual object presented in a greeting form according to example embodiments of the disclosure, which realizes a scenario that the anchor user controls, through voice, the virtual object to interact with the audience user.

In these embodiments, the anchor user does not need to perform additional operations on the first electronic device, only needs to say what she wants the virtual object to do. The first electronic device collects and sends the corresponding first voice signal to the server side, and then the server side performs analysis and recognition to the first voice signal to generate a corresponding control instruction, thus controlling the virtual object to perform an action corresponding to the control instruction. The above process enables the server side controls the virtual object remotely and also realizes the scenario that the anchor user uses the voice to control the virtual object to interact with the audience user, which reduces the operation steps of the live streaming user, and further facilitates the user and helps optimize the user experience.

In some embodiments, the anchor user can control the virtual object to perform different actions by voice, such as greeting, smiling, giving a love, etc. The first electronic device can collect and send different first voice signals to the server side. The server side can generate different control instructions based on different first voice signals, thus controlling the virtual object to interact with the audience user in different ways. The diversified interactive ways are beneficial to optimize the user experience.

In some embodiments, a plurality of different action data of the virtual object may be pre-stored on the first electronic device and the second electronic devices. After receiving the control instruction, the first electronic device and the second electronic devices may determine corresponding action data according to the control instruction, and run the action data for the virtual object, so that the virtual object can execute the action corresponding to the control instruction.

In other embodiments, when the server side sending the control instruction to the first electronic device and several second electronic devices that are in the same virtual space, the action data corresponding to the control instruction is also be sent, so that the first electronic device and several second electronic devices can run the action data for the virtual object based on the control instruction, and the virtual object can execute the action corresponding to the control instruction.

It is understandable that the embodiments of the disclosure do not impose any restrictions on a presentation form of the virtual object, and the presentation form can be specifically set according to actual application scenarios. For example, the virtual object can be displayed in a 2D form or a 3D form, and a visualized virtual object helps enhance the entertainment of live streaming, thus increasing the enthusiasm of users to participate in interaction.

In some embodiments, a Socket channel for transmitting the first voice signal may be established between the first electronic device and the server side. After the first voice signal collected by the first electronic device being preprocessed, a packet processing is performed on the preprocessed first voice signal to obtain a number of data packets. Each data packet includes a unique identifier. The first electronic device passes the data packets through the Socket channel to the server side. After receiving all the data packets, the server side restores all the data packets into a voice signal in an orderly manner based on the unique identifiers, and performs recognition and parse to obtain the first recognition result. As one of the possible implementation manners, the server side may also return the first recognition result to the first electronic device through the Socket channel. It is understandable that the embodiments of the disclosure will not impose any restrictions on the specific operations of the preprocessing, and specific settings can be made according to the actual situation, for example, the operations can be noise reduction operations.

In some embodiments, another Socket channel for transmitting the control instruction may be established between the first electronic device and the server side, and between the second electronic devices and the server side. The control instruction generated by the server side can be processed through a protobuf protocol, and transmitted to the first electronic device and the second electronic devices through the Socket channel in a form of binary. After receiving the control instruction in the binary form, the first electronic device and the second electronic devices parse the control instruction through the protobuf protocol and control, using the parsed control instruction, the virtual object to perform an action corresponding to the control instruction.

In some embodiments, the control instruction may include an action instruction for the virtual object and an operation instruction for a virtual space function. For example, the control instruction is used to: control the virtual object to perform a first action corresponding to the action instruction, and control the first electronic device to perform the operation instruction for the virtual space function, the first action is associated with the virtual space function. After receiving the control instruction, the first electronic device may use the action instruction to control the virtual object to perform the first action corresponding to the action instruction and perform the operation instruction for the virtual space function, and the first action is associated with the live streaming room function, thus enabling the scenario that the virtual object helps the anchor user realizing the virtual space function, which not only reduces the user's operation steps, realizes the control of the virtual space function through voice, but also enhances the entertainment of live streaming and increases the enthusiasm of users to participate in interaction.

It is understandable that the embodiments of the disclosure do not impose any restrictions on the virtual space function, and the virtual space function can be specifically set according to actual application scenarios. For example, the virtual space functions include any one or more of the following: music playing function, flip function for the front camera and rear camera, and interactive function with microphone, etc.

In some embodiments, if the first recognition result obtained by recognizing and parsing the first voice signal by the server side is 'Little Kuai, Play Music', a control instruction may be generated based on the first recognition result, and the control instruction is used to control the virtual object to perform the first action corresponding to the action instruction, and to control the first electronic device to perform the operation instruction for the music playing function. The first action is associated with the music playing function, for example, the first action may be an action that the virtual object clicks a music playing control, wherein the music playing control provides an entry to the music playing function. The server side sends the control instruction to the first electronic device so that the first electronic device can use the action instruction to control the virtual object to perform the first action corresponding to the action instruction and the operation instruction for the music playing function. The first action is associated with the music playing function, for example, the first action can be an action that the virtual object clicks a music playing control, wherein the music playing control provides an entry to the music playing function, in order to implement a scenario that the virtual object helps the anchor user to realize the virtual space function, which not only reduces the user's operation steps, further facilitates usage of the user, but also enhances the entertainment of the live streaming, increases the enthusiasm of users to participate in interaction.

Figure 4:
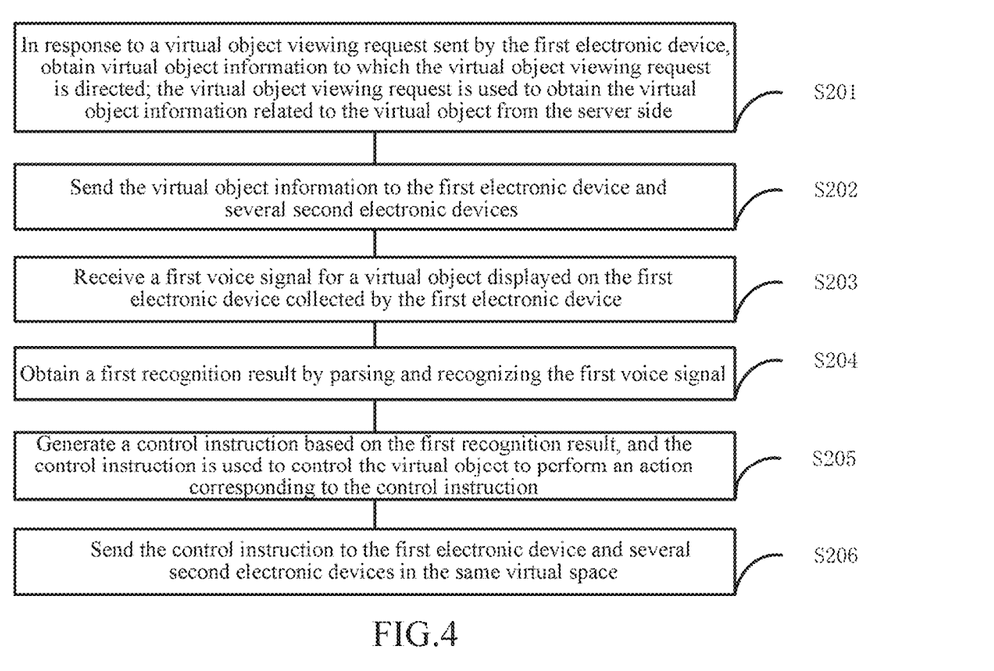
FIG. 4 is a flowchart showing a second method for controlling data according to example embodiments of the disclosure.

FIG. 4 is a flowchart showing a second method for controlling data according to example embodiments of the disclosure, which is applied to a server side, and the server side may be a large computing device such as a server, a cloud server and so on. The second method for controlling data includes the following.

In S201, in response to a virtual object viewing request sent by the first electronic device, virtual object information to which the virtual object viewing request is directed is obtained; the virtual object viewing request is used to obtain the virtual object information related to the virtual object from the server side.

In S202, the virtual object information is sent to the first electronic device and several second electronic devices.

In S203, a first voice signal for a virtual object displayed on the first electronic device collected by the first electronic device is received, which is similar to S101 and will not be repeated here.

In S204, a first recognition result is obtained by parsing and recognizing the first voice signal, which is similar to S102 and will not be repeated here.

In S205, a control instruction is generated based on the first recognition result, and the control instruction is used to control the virtual object to perform an action corresponding to the control instruction, which is similar to S103 and will not be repeated here.

In S206, the control instruction is sent to the first electronic device and several second electronic devices in the same virtual space, which is similar to S104 and will not be repeated here.

In these embodiments, during the live streaming, if the anchor user wants to interact with the audience through the virtual object, she can operate the designated virtual object viewing control on her first electronic device, wherein the virtual object viewing control provides an entry of obtaining the virtual object information. In addition, it is understandable that the embodiments of the disclosure do not impose any restrictions on this operation, and specific settings can be made according to the actual situation, such as clicking, long-pressing and other operations.

The first electronic device detect a triggering operation of the virtual object viewing control and generate a virtual object viewing request which will be sent to the server side. After receiving the virtual object viewing request of the first electronic device, the server side can obtain the virtual object information. That is, the virtual object viewing request is used to obtain virtual object information related to the virtual object from the server side; then the server side sends the virtual object information to in the first electronic device and several second electronic devices which are in the same virtual space, so that the first electronic device and several second electronic devices can use the virtual object information to render and display the virtual object after acquiring the virtual object information. The embodiments realize a process of presenting the virtual object of the live streaming user to the audience user, so that the process of live streaming interaction can be realized through the virtual object, and there is no need for the anchor user to perform any operation to the virtual object. Furthermore, the first electronic device can collect the voice signal of the anchor user in real time, and send the collected voice signal to the server side, and remotely control the virtual object through the server side to further interact with the audience user, which not only reduces the user's operation, but also helps to enhance the entertainment of the live streaming.

Figure 5:
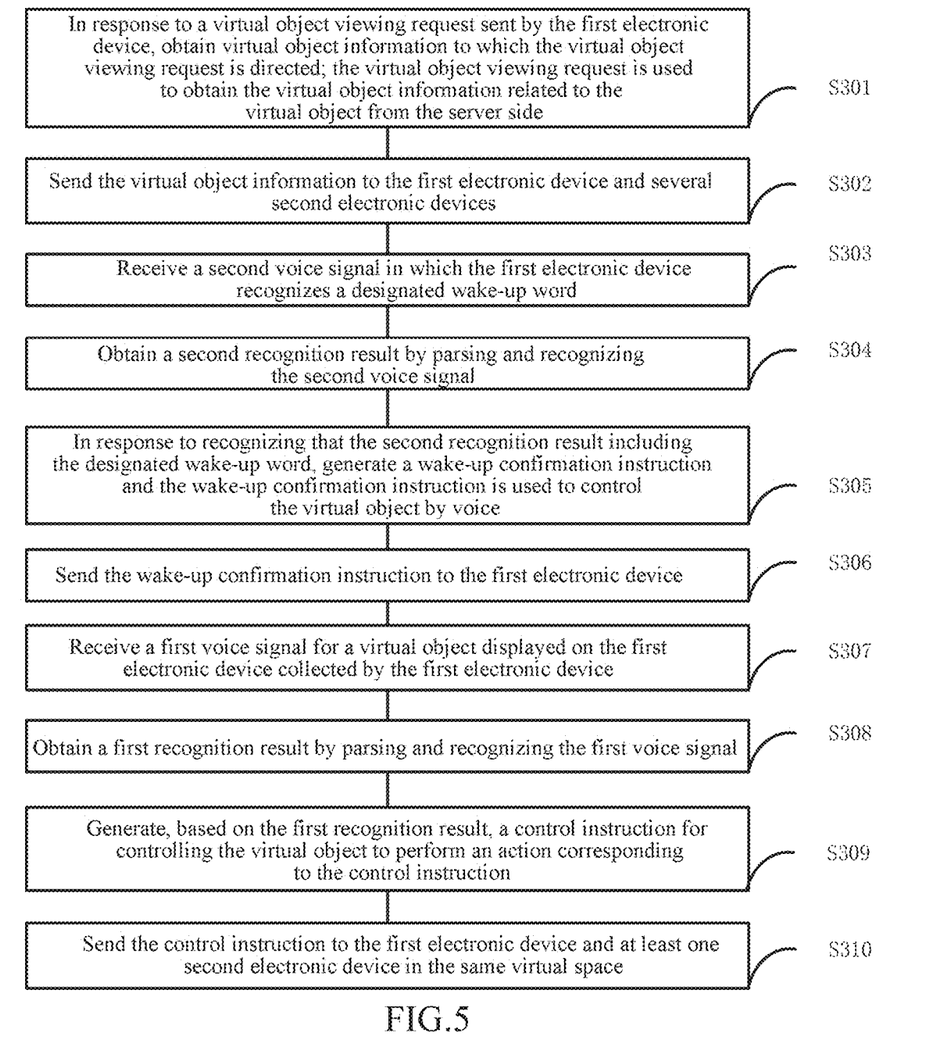
FIG. 5 is a flowchart showing a third method for controlling data according to example embodiments of the disclosure.

FIG. 5 is a flowchart showing a third method for controlling data according to example embodiments of the disclosure, which is applied to a server side, and the server side may be a large computing device such as a server or a cloud server. The third method for controlling data includes the following.

In S301, in response to a virtual object viewing request sent by the first electronic device, virtual object information to which the virtual object viewing request is directed is obtained; the virtual object viewing request is used to obtain, from the server side, the virtual object information related to the virtual object, which is similar to S201 and will not be repeated here.

In S302, the virtual object information is sent to the first electronic device and several second electronic devices, which is similar to S202 and will not be repeated here.

In S303, a second voice signal in which the first electronic device recognizes a designated wake-up word is received.

In S304, a second recognition result is obtained by parsing and recognizing the second voice signal.

In S305, in response to recognizing that the second recognition result including the designated wake-up word, a wake-up confirmation instruction is generated and the wake-up confirmation instruction is used to control the virtual object by voice.

In S306, the wake-up confirmation instruction is sent to the first electronic device.

In S307, a first voice signal for a virtual object displayed on the first electronic device collected by the first electronic device is received, which is similar to S101 and will not be repeated here.

In S308, a first recognition result is obtained by parsing and recognizing the first voice signal, which is similar to S102 and will not be repeated here.

In S309, a control instruction is generated based on the first recognition result, and the control instruction is used to control the virtual object to perform an action corresponding to the control instruction, which is similar to S103 and will not be repeated here.

In S310, the control instruction is sent to the first electronic device and several second electronic devices in the same virtual space, which is similar to S104 and will not be repeated here.

In these embodiments, after using the virtual object information to render and display the virtual object, the first electronic device collects the voice signal of the anchor user in real time. However, in order to ensure the accuracy of voice recognition, the first electronic device does not immediately send the collected second voice signal to the server side, but performs, on the first electronic device, recognition and analysis on the collected second voice signal. The second voice signal recognized this time is sent to the server side for a secondary recognition, in response to that the recognition result includes a designated wake-up word. After receiving the second voice signal in which the first electronic device recognizes the designated wake-up word, the second voice signal is parsed and recognized to obtain a second recognition result.

When it is recognized that the second recognition result includes the designated wake-up word, which indicates the anchor user wants to control the virtual object by voice on the first electronic device, then the server side generates the wake-up confirmation instruction to be sent to the first electronic device. The wake-up confirmation instruction denotes that the first electronic device can control the virtual object by voice, that is, after receiving the wake-up confirmation instruction, the first electronic device may collect, based on the wake-up confirmation instruction, a first voice signal specific to the virtual object. The server side generates a control instruction according to the first voice signal, so that the virtual object can perform an action corresponding to the control instruction. When it is recognized that the second recognition result does not include the designated wake-up word, the first electronic device continues to collect the user's second voice signal until a designated wake-up word is recognized by both the first electronic device and the server side. In these embodiments, by two recognition confirmation processes of the designated wake-up word on the first electronic device and on the server side, it is helpful to ensure the accuracy of the wake-up confirmation process, thus ensuring the accuracy of subsequent voice recognition and the control instruction generation. At the same time, it also avoids collecting too many invalid voice signals to be sent to the server side, which will cause a waste of recognition resources on the server side.

It is understandable that the embodiments of the disclosure do not impose any restriction on the designated wake-up word, and it can be specifically set according to the actual situation. For example, the wake-up word may be 'Little Kuai, Wake Up'.

In some embodiments, the first electronic device may include a preset voice recognition model for recognizing whether the collected second voice signal includes a designated wake-up word. If the first electronic device recognizes the designated wake-up word by the voice recognition model, the second voice signal recognized this time is sent to the server side for the secondary recognition. The server side also includes a preset voice recognition model for recognizing whether the received second voice signal includes the designated wake-up word. The double wake-up word recognition processes on the first electronic device and the server side in these embodiments help ensure the accuracy of the wake-up confirmation. Furthermore, the second voice signal can be transmitted through the aforementioned Socket channel established between the first electronic device and the server side, which is used for transmitting the voice signal. It is understandable that the embodiments of the disclosure do not impose any restrictions on the specific form of the voice recognition model, and may be specifically set according to actual application scenarios.

In some embodiments, during the live streaming, in order to let the audience user and the anchor user know whether the virtual object is successfully woken up, the server side may also send the wake-up confirmation instruction to the second electronic devices, and the wake-up confirmation instruction is further used to instruct the first electronic device and the second electronic devices to display the virtual object with a pre-stored wake-up form, so that the audience user and the anchor user know that the virtual object has been successfully woken up, which plays a good reminder role and is conducive to improving the user experience.

Figure 6:
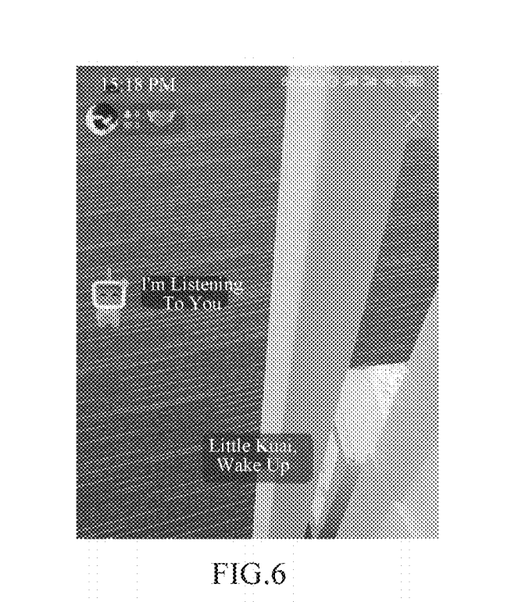
FIG. 6 is a schematic diagram showing a virtual object presented in a smiling 3D form according to example embodiments of the disclosure.

In some examples, referring to FIG. 6, after the first electronic device receiving the wake-up confirmation instruction, the virtual object may be presented in a 3D form such as a smile, that is different from the previous form, so that the anchor user can know the virtual object has been successfully woken up, which serves as a good reminder and helps to improve the user experience.

In other embodiments, the wake-up confirmation instruction may also include text information, such as 'Little Kuai has been successfully woken up'. The first electronic device and the second electronic devices may display corresponding information according to the wake-up confirmation instruction, thus reminding the audience user and the anchor user that the virtual object has been successfully woken up.

In some embodiments, the first electronic device collects and recognizes the second voice signal of the anchor user in real time. As one of the implementation manners, in the process of collecting the second voice signal, the first electronic device recognizes the second voice signal collected within a specified time period each time. It is understandable that the embodiments of the disclosure do not impose any restrictions on the specified time period, and can be specifically set according to actual application scenarios. In one example, the specified time period is 1 second, that is, after the first electronic collects 1 second of the second voice signal, the second voice signal is recognized and parsed.

In a possible implementation, the anchor user may also speak words that control the virtual object after uttering the designated wake-up word, that is, the second voice signal collected within the specified time period may include content used to generate the control instruction. In order to improve the accuracy of voice recognition, the first electronic device recognizes and parses the collected second voice signal. If the recognition result includes a designated wake-up word, then the recognized second voice signal in this recognition is sent to the server side for a secondary recognition. After receiving the second voice signal in which the first electronic device recognizes the designated wake-up word, the server side performs parse and recognition on the second voice signal to obtain a second recognition result. When it is recognized that the second recognition result includes the designated wake-up word, a wake-up confirmation instruction is generated and the server side can obtain content after the designated wake-up word in the second recognition result and generate the control instruction according to the content (the control instruction is used to control the virtual object to perform the action corresponding to the control instruction), and then send the wake-up confirmation instruction and the control instruction to the first electronic device and several second electronic devices which are in the same virtual space, so that on the first electronic device and the second electronic devices, the virtual object can immediately respond to the voice of the anchor user after being woken up and perform the action corresponding to the control instruction. These embodiments are beneficial to improve the accuracy of voice signal recognition, while also taking into account the user's speaking habits to achieve accurate response to the user's voice signal, which is convenient for the user to use, and further reduce the user's operation steps, enhance the interest of live streaming, mobilize the enthusiasm of users to participate in interaction.

Figure 7:
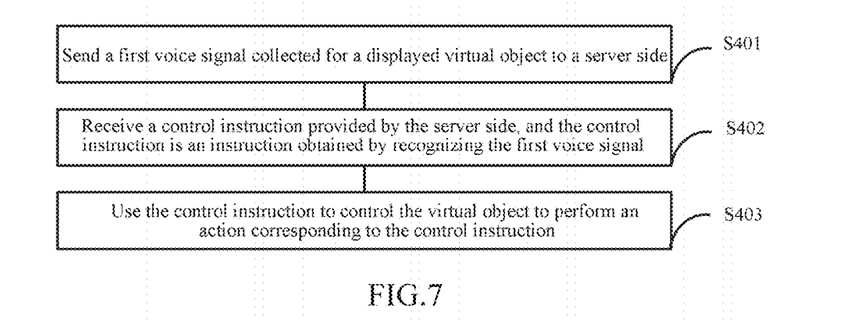
FIG. 7 is a flowchart of a fourth method for controlling data according to example embodiments of the disclosure.

FIG. 7 is a flowchart of a fourth method for controlling data according to example embodiments of the disclosure, which is applied to a first electronic device, and the first electronic device may be a computer, a tablet, or a mobile phone. The fourth method for controlling data includes the following.

In S401, a first voice signal collected for a displayed virtual object is sent to a server side.

In S402, a control instruction provided by the server side is received and the control instruction is an instruction obtained by recognizing the first voice signal.

In S403, the control instruction is used to control the virtual object to perform an action corresponding to the control instruction.

In some embodiments, the control instructions include an action instruction for the virtual object and an operation instruction for a virtual space function;

The S403 includes: using the action instruction to control the virtual object to perform a first action corresponding to the action instruction and perform the operation instruction for the virtual space function; the first action is associated with the virtual space function of the live streaming.

In an embodiment, before sending the first voice signal collected for the displayed virtual object to the server side, the method further includes: obtaining an virtual object viewing request and the virtual object viewing request is used to obtain virtual object information related to the virtual object from the server side; sending the virtual object viewing request to the server side; obtaining the virtual object information fed back by the server side; rendering and displaying the virtual object using the virtual object information.

In some embodiments, after rendering and displaying the virtual object using the virtual object information, and before sending the first voice signal collected for the displayed virtual object to the server side, the method further includes: collecting and recognizing a second voice signal; in response to the recognized result including a designated wake-up word, sending a second voice signal to the server side, wherein the second voice signal is used to trigger the server side to recognize whether the second voice signal includes the designated wake-up word; receiving a wake-up confirmation instruction returned by the server side, the wake-up confirmation instruction is generated by the server side after the designated wake-up word is recognized and the wake-up confirmation instruction is used to control the virtual object by voice.

In some embodiments, receiving the wake-up confirmation instruction returned by the server side includes: receiving the control instruction and the wake-up confirmation instruction returned by the server side, and the control instruction is further generated from content after the designated wake-up word in the second recognition result.

In some embodiments, the wake-up confirmation instruction is further used to instruct the first electronic device to display the virtual object with a pre-stored wake-up form.

In some embodiments, after receiving the wake-up confirmation instruction returned by the server side, the method further includes: in response to collecting the first voice signal for the virtual object, displaying the virtual object in a pre-stored listening form.

Figure 8A:
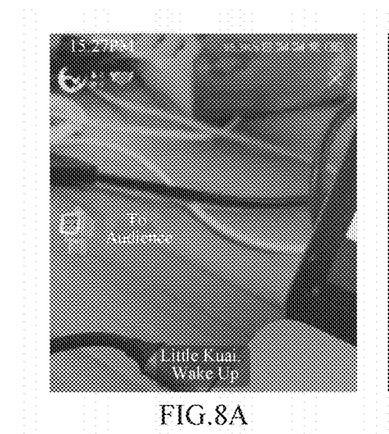
FIG. 8A is a schematic diagram showing a virtual object presented in a pre-stored listening form according to example embodiments of the disclosure.

In the process of the first electronic device collecting the first voice signal referring to FIG. 8A, the virtual object can be displayed in the pre-stored listening form, thus creating a scenario that the virtual object is listening to the anchor user, which realize the interaction between the anchor user and the virtual object, increase the entertainment of the live streaming, and increase the enthusiasm of users to participate in the interaction.

Figure 8B:
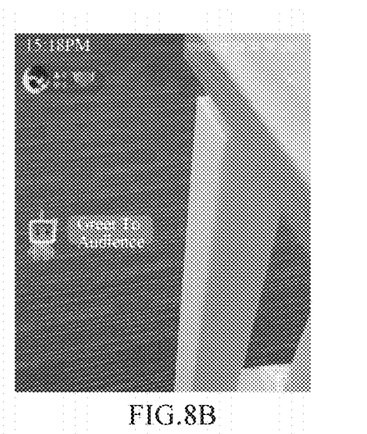
FIG. 8B is a schematic diagram showing a first recognition result according to example embodiments of the disclosure.

Further, referring to FIG. 8B, the first electronic device may send the collected first voice signal to the server side, and the server side may transmit the first recognition result obtained by recognizing the first voice signal to the first electronic device, so that the first electronic device can display the first recognition result, and further control, based on the control instruction sent by the server side, the virtual object to perform an action corresponding to the control instruction, which can create a scenario that the virtual object has an interaction with the audience user according to the voice command of the anchor user, increases the entertainment of the live streaming, thus increasing the enthusiasm of the user to participate in the interaction.

Figure 9:
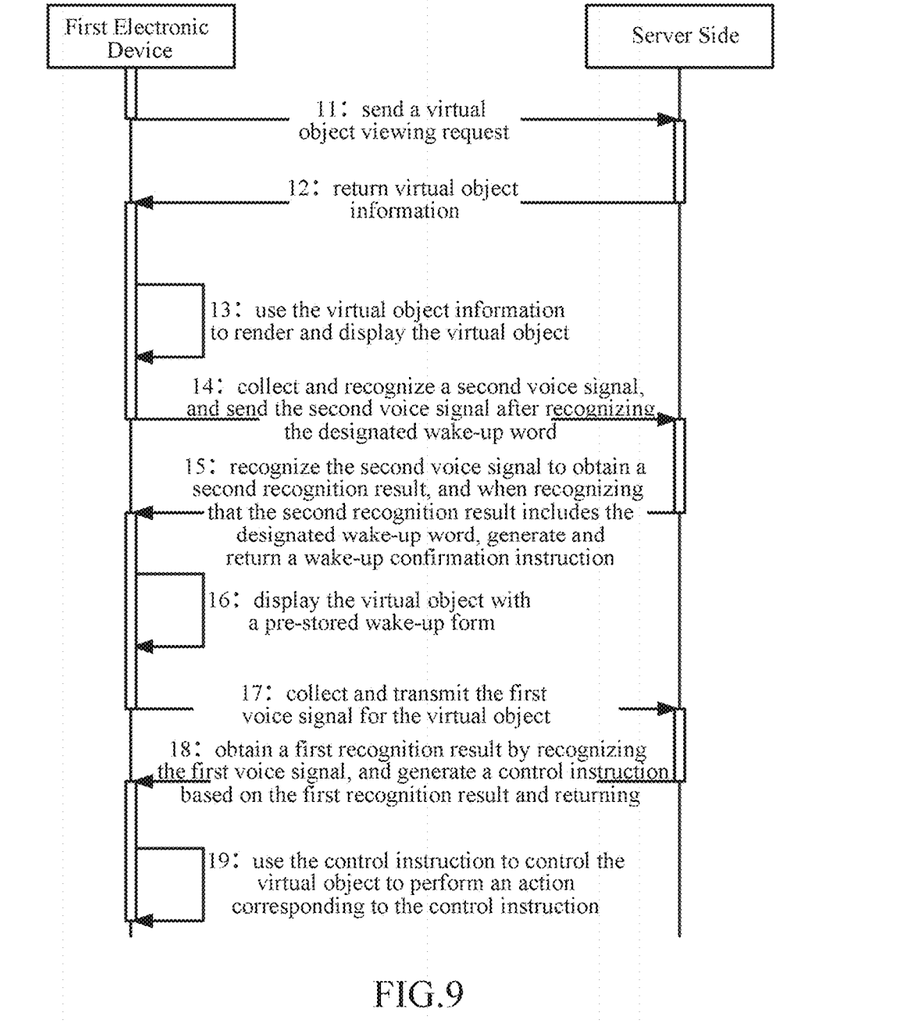
FIG. 9 is a sequence diagram of voice interaction between a first electronic equipment and a server side according to example embodiments of the disclosure.

FIG. 9 is a sequence diagram of voice interaction between a first electronic device and a server side. The embodiment shown in FIG. 9 includes the following.

11: sending a virtual object viewing request by the first electronic device;

12: in response to the virtual object viewing request, obtaining, by the server side, and returning virtual object information to the first electronic device;

13: using, by the first electronic device, the virtual object information to render and display the virtual object;

14: collecting and recognizing, by the first electronic device, a second voice signal, and after recognizing the designated wake-up word by the first electronic device, sending the second voice signal;

15: recognizing, by the server side, the second voice signal to obtain a second recognition result, and when recognizing that the second recognition result includes the designated wake-up word, generating and returning a wake-up confirmation instruction;

16: displaying, by the first electronic device, the virtual object with a pre-stored wake-up form;

17: collecting and transmitting, by the first electronic device, the first voice signal for the virtual object;

18: obtaining, by the server side, a first recognition result by recognizing the first voice signal, and generating a control instruction based on the first recognition result and returning to the first electronic device;

19: using, by the first electronic device, the control instruction to control the virtual object to perform an action corresponding to the control instruction.

Corresponding to the embodiments of the method for controlling data of the disclosure, the disclosure also provides embodiments of a device for controlling data, an electronic equipment, a live streaming system, and computer-readable storage medium.

Figure 10:
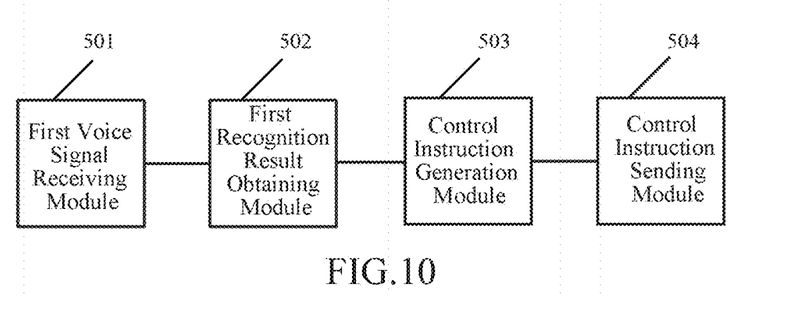
FIG. 10 is a block diagram of a first embodiment of a device for controlling data according to example embodiments of the disclosure.

FIG. 10 is a block diagram of a first embodiment of a device for controlling data provided by embodiments of the disclosure. The device is applied to a server side and includes a first voice signal receiving module 501, a first recognition result obtaining module 502, a control instruction generation module 503, and a control instruction sending module 504.

The first voice signal receiving module 501 is configured to receive a first voice signal for a virtual object displayed on a first electronic device collected by the first electronic device.

The first recognition result obtaining module 502 is configured to obtain a first recognition result by parsing and recognizing the first voice signal.

The control instruction generation module 503 is configured to generate, based on the first recognition result, a control instruction for controlling the virtual object to perform an action corresponding to the control instruction.

The control instruction sending module 504 is configured to send the control instruction to the first electronic device and at least one second electronic device in the same virtual space.

In some embodiments, the control instruction comprises an action instruction for the virtual object and an operation instruction for a virtual space function; and the control instruction is used to control the virtual object to perform a first action corresponding to the action instruction and control the first electronic device to perform the operation instruction for the virtual space function; wherein the first action is associated with the virtual space function.

In some embodiments, before the first voice signal receiving module 501, the device for controlling data further includes a virtual object information obtaining module and a virtual object information sending module.

The virtual object information obtaining module is configured to in response to a virtual object viewing request sent by the first electronic device, obtain virtual object information to which the virtual object viewing request is directed, wherein the virtual object viewing request is used for obtaining the virtual object information related to the virtual object from the server side.

The virtual object information sending module is configured to send the virtual object information to the first electronic device and the at least one second electronic device.

In some embodiments, after the virtual object information sending module and before the first voice signal receiving module 501, the device for controlling data further includes a second voice signal receiving module, a second recognition result obtaining module, a wake-up confirmation instruction generation module and a wake-up confirmation instruction sending module.

The second voice signal receiving module is configured to receive a second voice signal in which the first electronic device recognizes a designated wake-up word.

The second recognition result obtaining module is configured to obtain a second recognition result by parsing and recognizing the second voice signal.

The wake-up confirmation instruction generation module is configured to generate a wake-up confirmation instruction in response to recognizing that the second recognition result including the designated wake-up word, and the wake-up confirmation instruction is used to control the virtual object by voice.

The wake-up confirmation instruction sending module is configured to send the wake-up confirmation instruction to the first electronic device.

In some embodiments, the device for controlling data further includes a content obtaining module, which is configured to obtain content after the designated wake-up word in the second recognition result. Furthermore, the control instruction generation module 503 is further configured to generate the control instruction based on the content, and the control instruction sending module 504 is further configured to send the control instruction to the first electronic device and at least one second electronic device in the same virtual space.

In some embodiments, the wake-up confirmation instruction sending module is further configured to send the wake-up confirmation instruction to the second electronic devices; the wake-up confirmation instruction is further used to instruct the first electronic device and the second electronic devices to display the virtual object in a pre-stored wake-up form.

Figure 11:
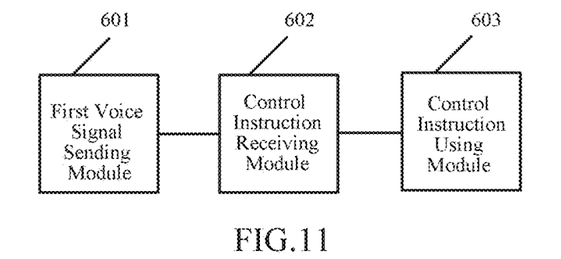
FIG. 11 is a block diagram of a second embodiment of a device for controlling data according to example embodiments of the disclosure.

FIG. 11 is a block diagram of a second embodiment of a device for controlling data according to example embodiments of the disclosure. The device for controlling data may include a first voice signal sending module 601, a control instruction receiving module 602, and a control instruction using module 603.

The first voice signal sending module 601 is configured to send a first voice signal collected for a displayed virtual object to a server side.

The control instruction receiving module 602 is configured to receive a control instruction provided by the server side, and the control instruction is an instruction obtained by recognizing the first voice signal.

The control instruction using module 603 is configured to use the control instruction to control the virtual object to perform an action corresponding to the control instruction.

In some embodiments, the control instruction comprises an action instruction for the virtual object and an operation instruction for a virtual space function; and the control instruction is used to control the virtual object to perform a first action corresponding to the action instruction and control the first electronic device to perform the operation instruction for the virtual space function; wherein the first action is associated with the virtual space function.

In some embodiments, before the first voice signal sending module 601, the device for controlling data further includes a viewing request obtaining module, a viewing request sending module, a virtual object information obtaining module and a virtual object information using module.

The viewing request obtaining module is configured to obtain a virtual object viewing request, and the virtual object viewing request is used to obtain the virtual object information related to the virtual object from the server side.

The viewing request sending module is configured to send the virtual object viewing request to the server side.

The virtual object information obtaining module is configured to obtain the virtual object information fed back by the server side.

The virtual object information using module is configured to render and display the virtual object using the virtual object information.

In some embodiments, after the virtual object using module and before the first voice signal sending module 601, the device for controlling data further includes a second voice signal collection and recognition module, a second voice signal sending module, and a wake-up confirmation instruction receiving module.

The second voice signal collection and recognition module is configured to collect and recognize a second voice signal.

The second voice signal sending module is configured to send a second voice signal to the server side in response to the recognized result including a designated wake-up word, wherein the second voice signal is used to trigger the server side to recognize whether the second voice signal includes the designated wake-up word.

The wake-up confirmation instruction receiving module is configured to receive a wake-up confirmation instruction returned by the server side, the wake-up confirmation instruction is generated by the server side after the designated wake-up word is recognized and the wake-up confirmation instruction is used to control the virtual object by voice.

In some embodiments, the wake-up confirmation instruction receiving module is further configured to receive the control instruction and the wake-up confirmation instruction returned by the server side, and the control instruction is further generated from content after the designated wake-up word in the second recognition result.

In some embodiments, the wake-up confirmation instruction is further used to instruct the first electronic device to display the virtual object with a pre-stored wake-up form.

In some embodiments, the device for controlling data further includes a virtual object displaying module, which is configured to display the virtual object in a pre-stored listening form in response to collecting the first voice signal for the virtual object.

As for the device embodiment, since it basically corresponds to the method embodiment, the relevant part can refer to the part of the description of the method embodiment. The device embodiments described above are merely illustrative, where the units described as separate components may or may not be physically separated, and the components displayed as units may or may not be physical units, that is, they may be located in same position, or it can be distributed to multiple network units. Some or all of the modules can be selected according to actual needs to achieve the objectives of the solutions of the disclosure. Those of ordinary skill in the art can understand and implement it without creative work.

Figure 12:
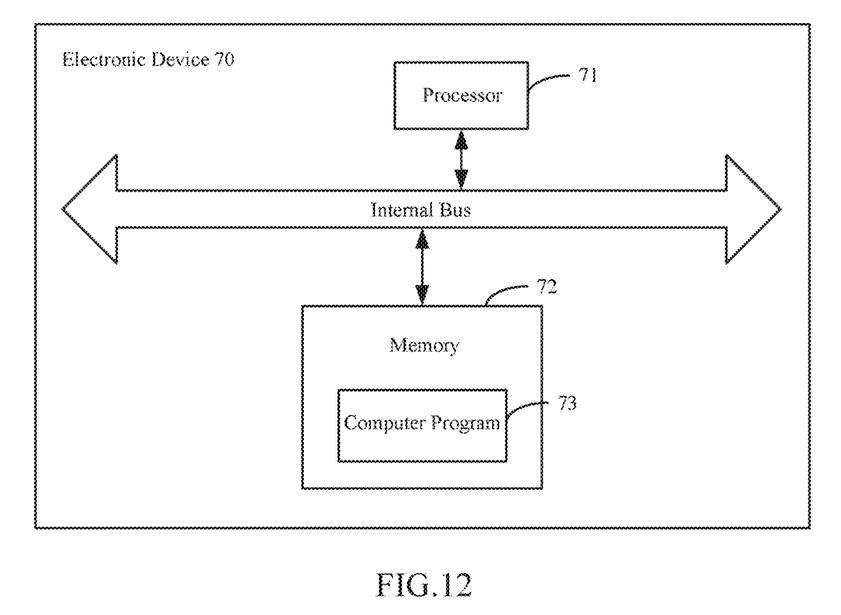
FIG. 12 is a block diagram showing an electronic equipment according to example embodiments of the disclosure.

FIG. 12 is a block diagram showing an electronic equipment 70 according to example embodiments of the disclosure. The electronic equipment 70 includes a processor 71 and a memory 72 for storing executable instructions. The memory 72 includes a computer program 73; wherein the processor 71 is configured to execute any of the above methods.

The processor 71 executes the computer program 73 included in the memory 72. The processor 71 may be a central processing unit (CPU), or may be other general-purpose processors, digital signal processors (DSP), Application Specific Integrated Circuit (ASIC), Field-Programmable Gate Array (FPGA) or other programmable logic devices, discrete gate or transistor logic devices, discrete hardware components, etc. The general-purpose processor may be a microprocessor or the processor may also be any conventional processor or the like.

The memory 72 stores a computer program of any one of the above methods. The memory 72 may include at least one type of storage medium. The storage medium includes flash memory, hard disk, multimedia card, card-type memory (for example, SD or DX memory, etc.)), random access memory (RAM), static random access memory (SRAM), read only memory (ROM), electrically erasable programmable read only memory (EEPROM), programmable read only memory (PROM), magnetic memory, magnetic disk, CD, etc. Moreover, the electronic equipment can cooperate with a network storage device that performs the storage function of the memory through a network connection. The memory 72 may be an internal storage unit of the electronic equipment 70, such as a hard disk or memory of the electronic equipment 70. The memory 72 may also be an external storage device of the electronic equipment 70, such as a plug-in hard disk, a smart memory card (SMC), a Secure Digital (SD) card, a flash card equipped on the electronic equipment 70, etc. Further, the memory 72 may also include both an internal storage unit of the electronic equipment 70 and an external storage device. The memory 72 is used to store the computer program 73 and other programs and data required by the electronic equipment. The memory 72 can also be used to temporarily store data that has been output or will be output.

The various embodiments described herein can be implemented using a computer-readable medium such as computer software, hardware, or any combination thereof. For hardware implementation, the implementation described herein can be achieved by using application-specific integrated circuits (ASIC), digital signal processors (DSP), digital signal processing devices (DSPD), programmable logic devices (PLD), field programmable gate arrays (FPGA), a processor, a controller, a microcontroller, a microprocessor, and an electronic unit designed to perform the functions described herein are implemented. For software implementation, implementations such as procedures or functions may be implemented with a separate software module that allows execution of at least one function or operation. The software codes can be implemented by software applications (or programs) written in any suitable programming language, and the software codes can be stored in a memory and executed by the controller.

The electronic equipment 70 includes but is not limited to the following forms: (1) Mobile terminal, this type of device having a mobile communication function, and its main objective is to provide voice and data communication. Such terminals include: smart phones (such as iPhone), multimedia phones, functional phones, and low-end phones, etc.; (2) Ultra-mobile personal computer equipment, this type of equipment belonging to the category of personal computers, and having computing and processing functions and also having mobile Interneting features, and such terminals including: PDA, MID, and UMPC devices, such as iPad; (3) Server, which is a device that provides computing services, the composition of the server includes a processor, a hard disk, a memory, a system bus, etc. The server and general computer architecture are similar, however, since it provides highly reliable services, it has higher requirements in terms of processing capacity, stability, reliability, security, scalability, and manageability; (4) other electronic devices with computing functions, and such devices may include, but is not limited to, a processor 71 and a memory 72. Those skilled in the art can understand that FIG. 12 is only an example of the electronic equipment 70 and does not constitute a limitation on the electronic equipment 70. It may include more or less components than those shown in the figure, or a combination of certain components, or different components. For example, the electronic equipment may also include input and output devices, network access devices, buses, camera devices, etc.

For the implementation process of the functions and roles of each unit in the above-mentioned electronic equipment can refer to the implementation process of the corresponding blocks in the above-mentioned method for details, which will not be repeated here.

In example embodiments, there is also provided a storage medium including instructions, such as a memory 72 including instructions, and the foregoing instructions may be executed by the processor 71 of the electronic equipment 70 to complete any of the foregoing methods. Alternatively, the storage medium may be a non-transitory computer-readable storage medium, for example, the non-transitory computer-readable storage medium may be ROM, random access memory (RAM), CD-ROM, magnetic tape, floppy disk, and optical data storage device, etc.

A non-transitory computer-readable storage medium with instructions stored thereon. When the instructions in the storage medium are executed by a processor of a terminal, the terminal can execute the above method for controlling data.

In example embodiments, there is also provided a computer program product, including executable program code, wherein the program code implements any of the foregoing method embodiments when executed by the foregoing apparatus.

Figure 13:
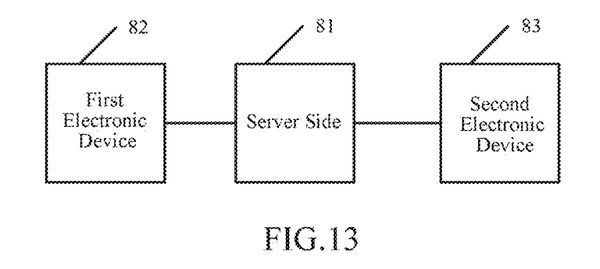
FIG. 13 is a structural diagram of a live streaming system according to example embodiments of the disclosure.

Correspondingly, FIG. 13 is a structural diagram of a live streaming system according to example embodiments of the present disclosure, including a server side 81, a first electronic device 82, and a second electronic device 83.

Wherein, the server side 81 and the first electronic device 82 are respectively used to execute the above-mentioned method for controlling data. The implementation process of the functions and roles of the server side 81 and the first electronic device 82 is detailed in the above implementation process of the corresponding blocks in the method, and will not be repeated here.

The second electronic device 83 is configured to receive a control instruction sent by the server side, and use the control instruction to control the virtual object to perform an action corresponding to the control instruction.

The second electronic device 83 is further configured to receive the virtual object information sent by the server side; and use the virtual object information to render and display the virtual object.

The second electronic device 83 is further configured to display the virtual object with a pre-stored wake-up form according to the received wake-up confirmation instruction.

Those skilled in the art will easily think of other embodiments of the disclosure after considering the specification and practicing the invention disclosed herein. The disclosure is intended to cover any variations, uses, or adaptive changes of the disclosure. These variations, uses, or adaptive changes follow the general principles of the disclosure and include common knowledge or conventional technical means in the technical field not disclosed in the disclosure. The description and the embodiments are to be regarded as illustrative only, and the true scope and spirit of the disclosure are pointed out by the appended claims.

It should be understood that the disclosure is not limited to the precise structure that has been described above and shown in the drawings, and various modifications and changes can be made without departing from the scope of the disclosure only limited by the appended claims.

What is claimed is:

1. A method for controlling data, the method comprising:
   in response to establishing a live streaming room using a live streaming function on a first electronic device by an anchor, receiving a first voice signal for a virtual object displayed on the first electronic device collected by the first electronic device, wherein the anchor is a user of the first electronic device;
   obtaining a first recognition result by parsing and recognizing the first voice signal;
   generating a control instruction based on the first recognition result, wherein the control instruction is used for controlling the virtual object to perform an action corresponding to the control instruction; and
   sending the control instruction to the first electronic device and at least one second electronic device in a same virtual space, so that an audience is capable of interacting with the virtual object through one of the at least one second electronic device, wherein the audience is a user of the one of the at least one second electronic device.

2. The method according to claim 1, wherein the control instruction comprises an action instruction for the virtual object and an operation instruction for a virtual space function;
   the control instruction is adapted to control the virtual object to perform a first action corresponding to the action instruction and control the first electronic device to perform the operation instruction for the virtual space function; wherein the first action is associated with the virtual space function.

3. The method according to claim 1, wherein before said receiving the first voice signal, the method further comprising:
   in response to a virtual object viewing request sent by the first electronic device, obtaining virtual object information to which the virtual object viewing request is directed, wherein the virtual object viewing request is used for obtaining the virtual object information related to the virtual object from the server side; and
   sending the virtual object information to the first electronic device and the at least one second electronic device.

4. The method according to claim 3, wherein after said sending the control instruction to the first electronic device and at least one second electronic device and before said receiving the first voice signal, the method further comprising:
   receiving a second voice signal in which the first electronic device recognizes a designated wake-up word;
   obtaining a second recognition result by parsing and recognizing the second voice signal;
   in response to the second recognition result including the designated wake-up word, generating a wake-up confirmation instruction for controlling the virtual object by voice; and
   sending the wake-up confirmation instruction to the first electronic device.

5. The method according to claim 4, wherein in response to recognizing that the second recognition result includes the designated wake-up word, the method further comprising:

obtaining content after the designated wake-up word in the second recognition result;

generating the control instruction based on the content; and sending the control instruction to the first electronic device and the at least one second electronic device in the same virtual space.

6. The method according to claim 4, further comprising:

sending the wake-up confirmation instruction to the second electronic devices, and the wake-up confirmation instruction is further used to instruct the first electronic device and the second electronic devices to display the virtual object in a pre-stored wake-up form.

7. A method for controlling data, comprising:

in response to establishing a live streaming room using a live streaming function on a first electronic device by an anchor, sending a first voice signal collected for a virtual object displayed on the first electronic device to a server side, wherein the anchor is a user of the first electronic device;

receiving a control instruction provided by the server side, wherein the control instruction is obtained by recognizing the first voice signal; and using the control instruction to control the virtual object to perform an action corresponding to the control instruction, so that an audience is capable of interacting with the virtual object through one of at least one second electronic device which are in a same virtual space with the first electronic device, wherein the audience is a user of the one of the at least one second electronic device.

8. The method according to claim 7, wherein the control instruction comprises an action instruction for the virtual object and an operation instruction for a virtual space function;

wherein said using the control instruction to control the virtual object to perform the action corresponding to the control instruction comprises:

using the action instruction to control the virtual object to perform a first action corresponding to the action instruction and perform the operation instruction for the virtual space function; wherein the first action is associated with the virtual space function.

9. The method according to claim 8, wherein before sending the first voice signal collected for the displayed virtual object to the server side, the method further comprising:

obtaining an virtual object viewing request, wherein the virtual object viewing request is used to obtain virtual object information related to the virtual object from the server side;

sending the virtual object viewing request to the server side;

obtaining the virtual object information fed back by the server side; and rendering and displaying the virtual object using the virtual object information.

10. The method according to claim 9, wherein after rendering and displaying the virtual object using the virtual object information and before sending the first voice signal collected for the displayed virtual object to the server side, the method further comprising:

collecting and recognizing a second voice signal;

in response to the recognized result including a designated wake-up word, sending a second voice signal to the server side, wherein the second voice signal is used to trigger the server side to recognize whether the second voice signal includes the designated wake-up word;

receiving a wake-up confirmation instruction returned by the server side, the wake-up confirmation instruction is generated by the server side after the designated wake-up word is recognized and the wake-up confirmation instruction is configured to control the virtual object by voice.

11. The method according to claim 10, wherein said receiving a wake-up confirmation instruction returned by the server side comprising:

receiving the control instruction and the wake-up confirmation instruction returned by the server side, and the control instruction is further generated from content after the designated wake-up word in the second recognition result.

12. The method according to claim 11, wherein the wake-up confirmation instruction is further used to instruct the first electronic device to display the virtual object in a pre-stored wake-up form.

13. The method according to claim 10, wherein after receiving the wake-up confirmation instruction returned by the server side, the method comprising:

in response to collecting the first voice signal for the virtual object, displaying the virtual object in a pre-stored listening form.

14. An electronic equipment, comprising:

a processor;

a memory for storing instructions executable by the processor;

wherein the processor is configured to execute a method for controlling data, the processor is configured to:

in response to establishing a live streaming room using a live streaming function on a first electronic device by an anchor, receive a first voice signal for a virtual object displayed on the first electronic device collected by the first electronic device, wherein the anchor is a user of the first electronic device;

obtain a first recognition result by parsing and recognizing the first voice signal;

generate a control instruction based on the first recognition result, wherein the control instruction is used for controlling the virtual object to perform an action corresponding to the control instruction; and send the control instruction to the first electronic device and at least one second electronic device in a same virtual space, so that an audience is capable of interacting with the virtual object through one of the at least one second electronic device, wherein the audience is a user of the one of the at least one second electronic device.

15. The electronic equipment according to claim 14, wherein the control instruction comprises an action instruction for the virtual object and an operation instruction for a virtual space function;

the control instruction is adapted to control the virtual object to perform a first action corresponding to the action instruction and control the first electronic device to perform the operation instruction for the virtual space function; wherein the first action is associated with the virtual space function.

16. The electronic equipment according to claim 14, wherein the processor is further configured to:

in response to a virtual object viewing request sent by the first electronic device, obtain virtual object information to which the virtual object viewing request is directed, wherein the virtual object viewing request is used for obtaining the virtual object information related to the virtual object from the server side; and send the virtual object information to the first electronic device and the at least one second electronic device.

17. The electronic equipment according to claim 14, wherein the processor is further configured to:

receive a second voice signal in which the first electronic device recognizes a designated wake-up word;

obtain a second recognition result by parsing and recognizing the second voice signal;

in response to the second recognition result including the designated wake-up word, generate a wake-up confirmation instruction for controlling the virtual object by voice; and send the wake-up confirmation instruction to the first electronic device.

18. The electronic equipment according to claim 17, wherein the processor is further configured to:

obtain content after the designated wake-up word in the second recognition result;

generate the control instruction based on the content; and send the control instruction to the first electronic device and the at least one second electronic device in the same virtual space.

19. The electronic equipment according to claim 14, wherein the processor is further configured to:

send the wake-up confirmation instruction to the second electronic devices, and the wake-up confirmation instruction is further configured to instruct the first electronic device and the second electronic devices to display the virtual object in a pre-stored wake-up form.

20. A computer-readable storage medium, wherein the computer-readable storage medium storing instructions, wherein the instructions stored in the computer-readable storage medium, when executed by a processor of an electronic equipment, cause the electronic equipment to execute a method for controlling data, the method for controlling data comprising:

in response to establishing a live streaming room using a live streaming function on a first electronic device by an anchor, receiving a first voice signal for a virtual object displayed on the first electronic device collected by the first electronic device, wherein the anchor is a user of the first electronic device;

obtaining a first recognition result by parsing and recognizing the first voice signal;

generating a control instruction based on the first recognition result, wherein the control instruction is used for controlling the virtual object to perform an action corresponding to the control instruction; and sending the control instruction to the first electronic device and at least one second electronic device in a same virtual space, so that an audience is capable of interacting with the virtual object through one of the at least one second electronic device, wherein the audience is a user of the one of the at least one second electronic device.

* * * * *